United States Patent
Cicala et al.

(10) Patent No.: US 10,323,702 B2
(45) Date of Patent: Jun. 18, 2019

(54) ADAPTION OF OFF-GOING CLUTCH TORQUE

(71) Applicant: FORD GLOBAL TECHNOLOGIES, LLC, Dearborn, MI (US)

(72) Inventors: Stephen Michael Cicala, Dearborn Hts., MI (US); Jaewon Choi, Northville, MI (US); Cory Benson Laroche, Wixom, MI (US); Kenneth Edward Sovel, Commerce Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 288 days.

(21) Appl. No.: 15/337,952

(22) Filed: Oct. 28, 2016

(65) Prior Publication Data

US 2018/0119756 A1  May 3, 2018

(51) Int. Cl.
| | | |
|---|---|---|
| F16H 48/06 | (2006.01) | |
| F16D 48/06 | (2006.01) | |
| F16H 61/02 | (2006.01) | |
| F16H 59/46 | (2006.01) | |
| F16H 61/04 | (2006.01) | |
| F16H 61/686 | (2006.01) | |
| F16H 3/66 | (2006.01) | |

(52) U.S. Cl.
CPC .............. *F16D 48/06* (2013.01); *F16H 59/46* (2013.01); *F16H 61/0202* (2013.01); *F16H 61/04* (2013.01); *F16H 61/686* (2013.01); *F16D 2500/108* (2013.01); *F16D 2500/1045* (2013.01); *F16D 2500/10412* (2013.01); *F16D 2500/302* (2013.01); *F16D 2500/506* (2013.01); *F16H 3/66* (2013.01); *F16H 2061/0429* (2013.01); *F16H 2061/0455* (2013.01); *F16H 2200/0069* (2013.01); *F16H 2200/2012* (2013.01); *F16H 2200/2046* (2013.01); *Y02T 10/76* (2013.01)

(58) Field of Classification Search
CPC ...... F16D 48/06; F16H 59/46; F16H 61/0202; F16H 61/04; F16H 61/686; F16H 2061/0429
See application file for complete search history.

(56) References Cited

U.S. PATENT DOCUMENTS

| | | | | |
|---|---|---|---|---|
| 5,119,697 A | * | 6/1992 | Vukovich | F16H 61/061 192/109 F |
| 6,319,172 B1 | * | 11/2001 | Steinmetz | F16H 61/061 192/48.601 |
| 6,616,576 B2 | * | 9/2003 | Saito | F16H 61/061 477/154 |
| 6,994,647 B2 | | 2/2006 | Cicala et al. | |

(Continued)

*Primary Examiner* — Stacey A Fluhart
(74) *Attorney, Agent, or Firm* — David B. Kelley; Brooks Kushman P.C.

(57) ABSTRACT

A vehicle includes a transmission and a controller. The transmission has clutches and multiple speed ratios that are established during gear upshifts upon torque being transferred from off-going to oncoming clutches. The controller is programmed to, in response to a difference between actual and target times of a desired flare at a transmission input exceeding a threshold during an upshift, adjust the torque of the off-going clutch during a torque transfer phase of a subsequent upshift based on the difference.

17 Claims, 4 Drawing Sheets

(56) References Cited

U.S. PATENT DOCUMENTS

| | | | |
|---|---|---|---|
| 7,282,012 B2 * | 10/2007 | Soliman | F16H 61/061 477/127 |
| 7,381,151 B2 | 6/2008 | Shim | |
| 8,255,130 B2 * | 8/2012 | Fujii | F16H 61/061 701/55 |
| 8,688,336 B2 * | 4/2014 | Thor | F16H 61/061 475/116 |
| 8,706,369 B2 | 4/2014 | Yanakiev et al. | |
| 9,181,995 B1 | 11/2015 | Thornton et al. | |
| 2004/0116250 A1 * | 6/2004 | Whitton | F16H 61/061 477/143 |

* cited by examiner

| Priority | Large-Late Flare | Time to Desired Flare or Start of Ratio Change (RC) | Aggressive Ramp Reached | Early Flare | Ratio Change Starts During Boost | Off-going Capacity Reduction Torque | Off-going Torque Transfer Torque Capacity |
|---|---|---|---|---|---|---|---|
| 1 | | | | F | T | No Adjustment | No Adjustment |
| 2 | | | | T | T | Raise Commanded Torque | No Adjustment |
| 3 | | | | T | F | Commanded Torque | No Adjustment |
| 4 | T | | | F | F | No Adjustment | Increase Based on Late Flare |
| 5 | F | Time to RC is OK | | F | F | Lower Commanded Torque | Reduce |
| 6 | F | Time to Flare or RC is Late | T | F | F | Lower Commanded Torque | Reduce |
| 7 | F | Time to Flare is Early and Flare is Large | | F | F | Lower Commanded Torque | Increase Based on Early Flare |
| 8 | F | Time to Flare or RC is Late | F | F | F | Lower Commanded Torque | Reduce to Early Up Flare |
| 9 | F | Time to Flare is OK | | F | F | Lower Commanded Torque | No Adjustment |

ADAPTION OF OFF-GOING CLUTCH TORQUE

TECHNICAL FIELD

This disclosure relates to systems for controlling clutches in automatic transmissions during gear shifts of the transmission.

BACKGROUND

Vehicle transmissions that employ more than one gearing ratio between an input and an output, may transition between various gear ratios by engaging and disengaging various clutches. The clutches may comprise alternating friction plates and separator plates that are configured to selectively couple two rotating elements (shafts, gears, etc.).

SUMMARY

A vehicle includes a transmission and a controller. The transmission has clutches and multiple speed ratios that are established during gear upshifts upon torque being transferred from off-going to oncoming clutches. The controller is programmed to, in response to a difference between actual and target initiation times of a speed ratio change exceeding a threshold during an upshift, adjust the torque of the off-going clutch during a torque transfer phase of a subsequent upshift based on the difference.

A vehicle includes a transmission and a controller. The transmission has clutches and multiple speed ratios that are established during gear upshifts upon torque being transferred from off-going to oncoming clutches. The controller is programmed to, in response to a difference between actual and target times of a desired flare at a transmission input exceeding a threshold during an upshift, adjust the torque of the off-going clutch during a torque transfer phase of a subsequent upshift based on the difference.

A method includes adjusting the torque of an off-going clutch in a vehicle transmission during a torque transfer phase of a subsequent transmission upshift based on and in response to a difference between actual and target times of a desired flare at a transmission input exceeding a threshold during a current upshift.

BRIEF DESCRIPTION OF THE DRAWINGS

FIG. 4 is a table of an exemplary strategy for adapting off-going clutch torque capacity during synchronous upshifts.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
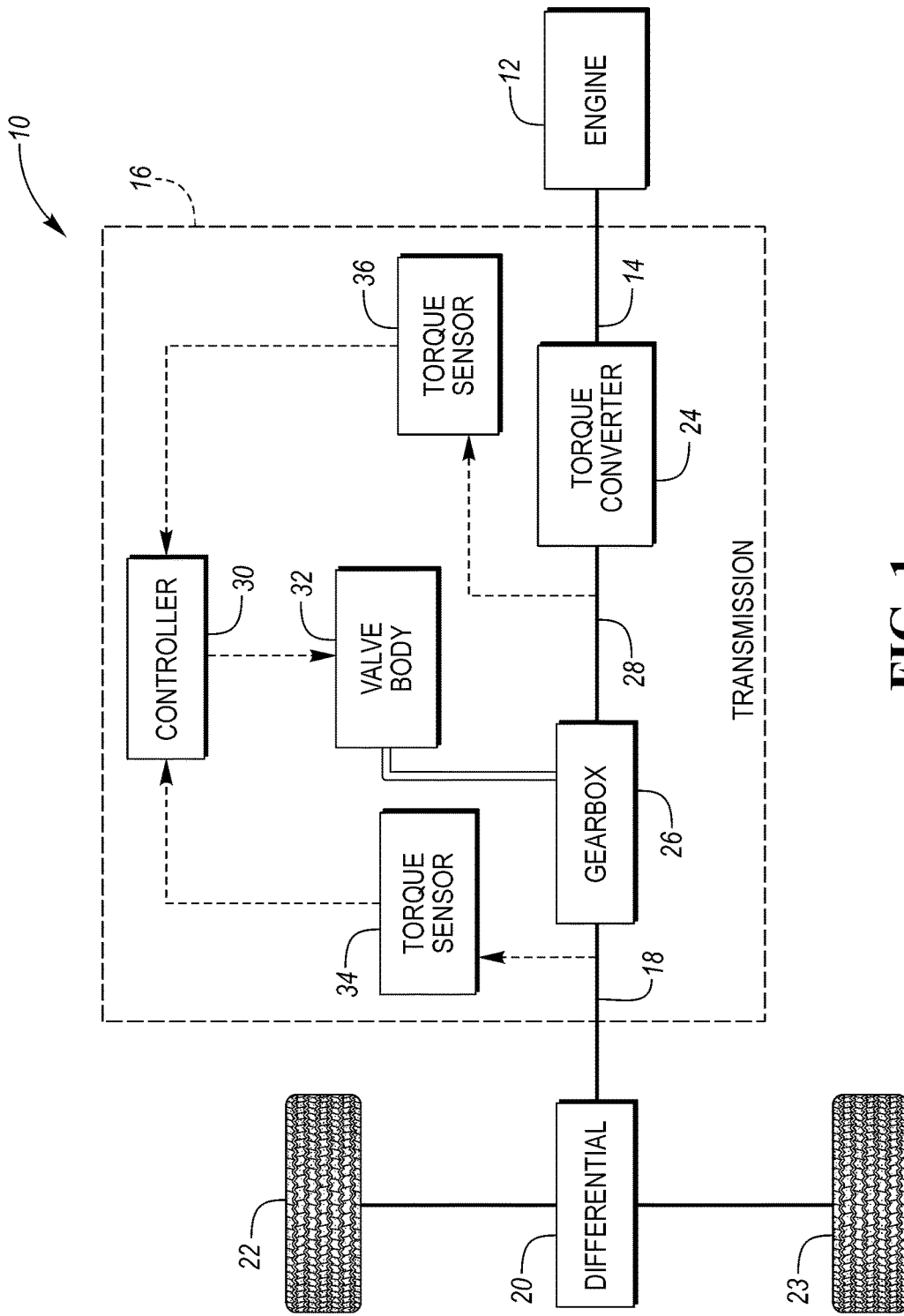
FIG. 1 is a schematic illustration of an exemplary vehicle and an exemplary vehicle powertrain.

A powertrain of a vehicle 10 is illustrated schematically in FIG. 1. Solid lines indicate mechanical connections. Broken lines represent the flow of signals. Double lines represent the flow of fluid. An engine 12 provides power to rotate a crankshaft 14. A transmission 16 transits the power from the crankshaft 14 to a driveshaft 18 while potentially modifying the speed and torque to be more suitable to the present vehicle requirements. A differential 20 distributes the power to a left wheel 22 and a right wheel 23 while permitting slight speed differences between the wheels such as when the vehicle 10 turns a corner.

The transmission includes a torque converter 24 and a gearbox 26. The torque converter 24 is a fluid coupling device that includes an impeller, stator, and turbine. The torque converter 24 transmits the power from the crankshaft 14 to a turbine shaft 28. The crankshaft 14 may be coupled to the impeller of the torque converter 24. The gearbox 26 transmits the power from the turbine shaft 28 to the driveshaft 18. A controller 30 sends signals to a valve body 32 causing the valve body 32 to send pressurized fluid to clutches in the gearbox 26. The gear ratio of the gearbox 26 depends upon which subset of the clutches are provided with pressurized fluid. The controller 30 utilizes many inputs to determine what commands to send to valve body 32 including signals from an output torque sensor 34 and a turbine torque sensor 36. Additionally, the transmission 16 may include several speed sensors that may be utilized to determine the slip across all the internal clutches in the gearbox 26. The speed sensors may be located at the input of the transmission 16, at the output of the transmission 16, and at least two intermediate positions within the gearbox 26 of the transmission 16. The input of the transmission may refer to the crankshaft 14, the impeller of the torque converter 24, or the turbine (i.e., turbine shaft 28) of the torque converter 24. The output of the transmission 16 may refer to the driveshaft 18.

While illustrated as one controller, the controller 30 may be part of a larger control system and may be controlled by various other controllers throughout the vehicle 10, such as a vehicle system controller (VSC). It should therefore be understood that the controller 30 and one or more other controllers can collectively be referred to as a "controller" that controls various actuators in response to signals from various sensors to control functions the vehicle 10 or vehicle subsystems. The controller 30 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 30 in controlling the vehicle 10 or vehicle subsystems.

Control logic or functions performed by the controller 30 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 30. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

The controller 30 may be configured to receive various states or conditions of the various vehicle components illustrated in FIG. 1 via electrical signals. The electrical signals may be delivered to the controller 30 from the various components via input channels. Additionally, the electrical signals received from the various components may be indicative of a request or a command to change or alter a state of one or more of the respective components of the vehicle 10. The controller 30 includes output channels that are configured to deliver requests or commands (via electrical signals) to the various vehicle components. The controller 30 includes control logic and/or algorithms that are configured to generate the requests or commands delivered through the output channels based on the requests, commands, conditions, or states of the various vehicle components.

The input channels and output channels are illustrated as dotted lines in FIG. 1. It should be understood that a single dotted line may be representative of both an input channel and an output channel into or out of a single element. Furthermore, an output channel into one element may operate as an input channel to another element and vice versa.

Figure 2:
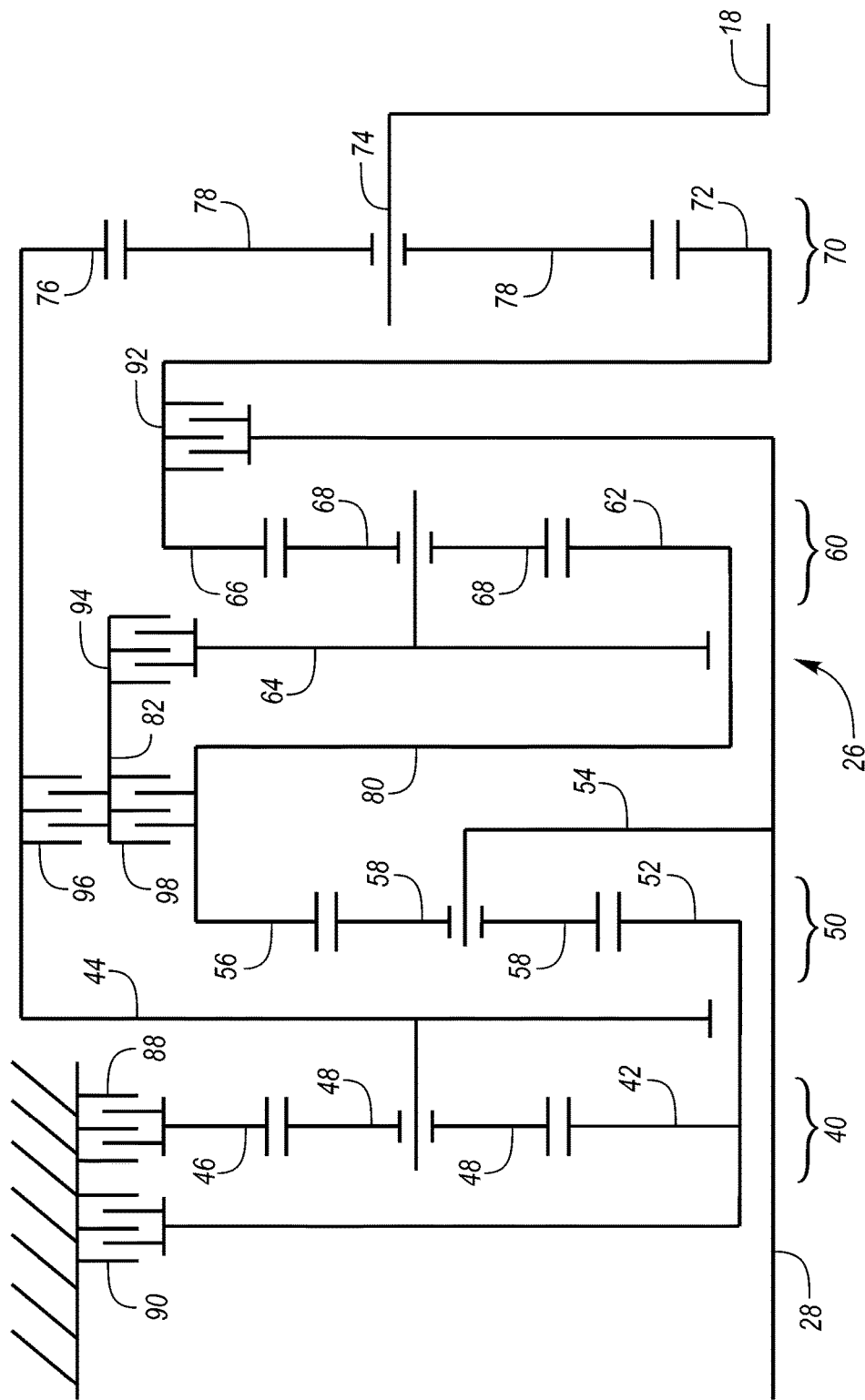
FIG. 2 is a schematic diagram of an exemplary transmission gearing arrangement.

An example gearbox is schematically illustrated in FIG. 2. The gearbox may also be referred to as a gearing arrangement. A gearing arrangement is a collection of rotating elements and clutches configured to impose specified speed relationships among elements. Some speed relationships, called fixed speed relationships, are imposed regardless of the state of any clutches. A gearing arrangement imposing only fixed relationships is called a fixed gearing arrangement. Other speed relationships are imposed only when particular clutches are fully engaged. A gearing arrangement that selectively imposes speed relationships is called a shiftable gearing arrangement. A discrete ratio transmission has a shiftable gearing arrangement that selectively imposes a variety of speed ratios between an input shaft and an output shaft.

A group of elements are fixedly coupled to one another if they are constrained to rotate as a unit in all operating conditions. Elements can be fixedly coupled by spline connections, welding, press fitting, machining from a common solid, or other means. Slight variations in rotational displacement between fixedly coupled elements can occur such as displacement due to lash or shaft compliance. In contrast, two elements are selectively coupled by a clutch when the clutch constrains them to rotate as a unit whenever the clutch is fully engaged and they are free to rotate at distinct speeds in at least some other operating condition. Clutches include actively controlled devices such as hydraulically or electrically actuated clutches and passive devices such as one way clutches. A clutch that holds an element against rotation by selectively connecting the element to a fixed component, such as a transmission housing, may be called a brake.

It should be noted that the proposed method is applicable to a wide variety of gearbox arrangements and should not be limited to the gearbox in FIG. 2. The gearbox utilizes four simple planetary gear sets 40, 50, 60, and 70. Sun gear 42 is fixed to sun gear 52, carrier 44 is fixed to ring gear 76, ring gear 56 is fixed to sun gear 62 by shaft 80, ring gear 66 is fixed to sun gear 72, turbine shaft 28 is fixed to carrier 54, and driveshaft 18 is fixed to carrier 74. Ring gear 46 is selectively held against rotation by brake 88 and sun gears 42 and 52 are selectively held against rotation by brake 90. Turbine shaft 28 is selectively coupled to ring gear 66 and sun gear 72 by clutch 92. Intermediate element 82 is selectively coupled to carrier 64 by clutch 94, selectively coupled to carrier 44 and ring gear 76 by clutch 96, and selectively coupled to shaft 80 by clutch 98.

As shown in Table 1, engaging the clutches and brakes in combinations of four establishes ten forward speed ratios and one reverse speed ratio between turbine shaft 28 and driveshaft 18. An X indicates that the corresponding clutch is engaged to establish the speed ratio.

TABLE 1

|  | 88 | 90 | 92 | 94 | 96 | 98 | Ratio | Step |
| --- | --- | --- | --- | --- | --- | --- | --- | --- |
| Rev | X | X |  | X | X |  | −4.79 | 102% |
| 1st | X | X | X | X |  |  | 4.70 |  |
| 2nd | X | X |  | X |  | X | 2.99 | 1.57 |
| 3rd | X |  | X | X |  | X | 2.18 | 1.37 |
| 4th | X |  |  | X | X | X | 1.80 | 1.21 |
| 5th | X |  | X |  | X | X | 1.54 | 1.17 |
| 6th | X |  |  | X | X | X | 1.29 | 1.19 |
| 7th |  |  | X | X | X | X | 1.00 | 1.29 |
| 8th |  | X | X | X | X |  | 0.85 | 1.17 |
| 9th |  | X | X |  | X | X | 0.69 | 1.24 |
| 10th |  | X |  | X | X | X | 0.64 | 1.08 |

All single step and two step shifts are performed by gradually engaging one clutch, called an oncoming element, while gradually releasing a different clutch, called the off-going element. During each of these shifts, three clutches, called holding elements, are maintained fully engaged while one element is maintained fully disengaged. In other gearbox arrangements, the number of holding elements may be different.

Figure 3:
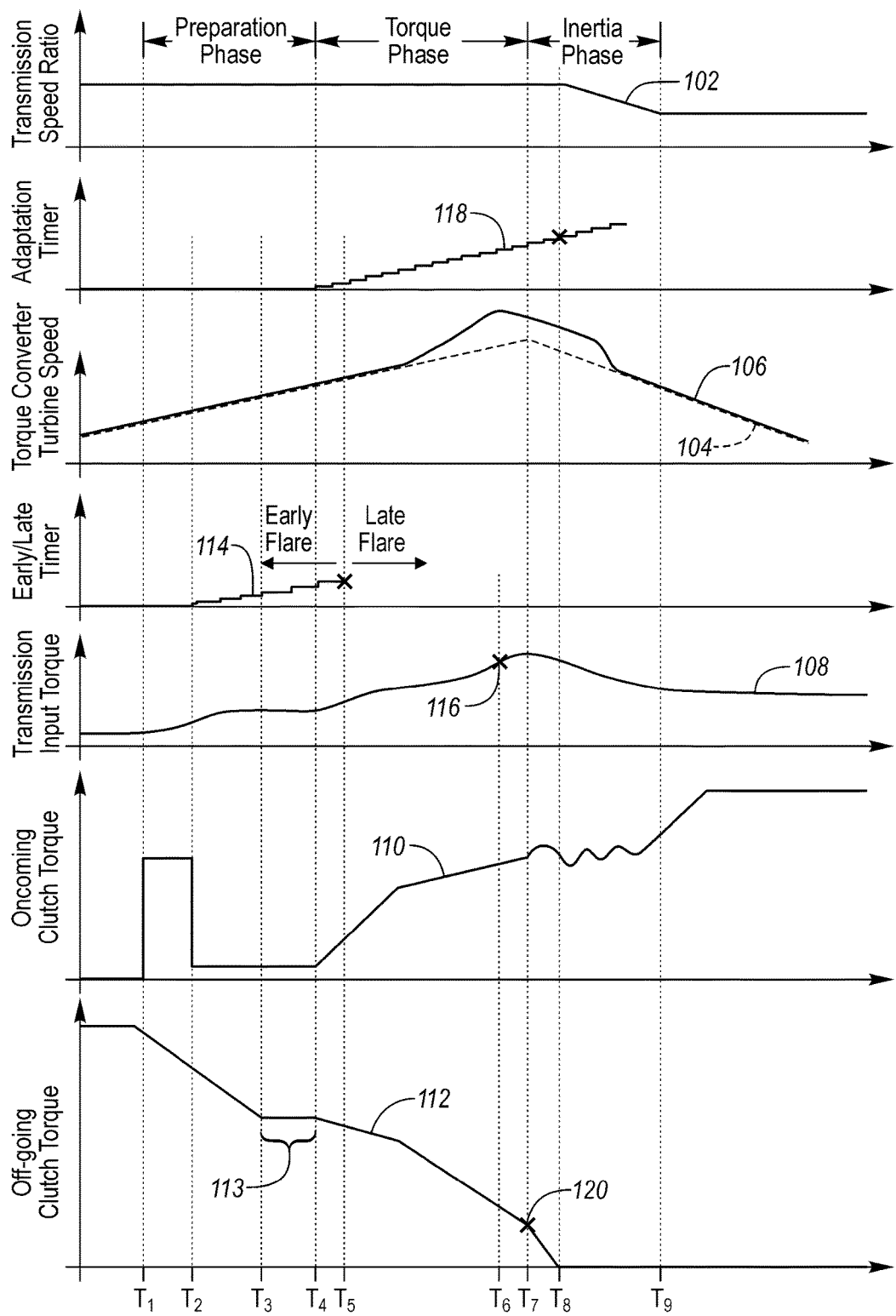
FIG. 3 is a graph representative of the changes of various physical states of a transmission during a synchronous upshift, including oncoming clutch torque and off-going clutch torque.

Referring to FIG. 3, a graph representative of the changes of various physical states of a transmission 16 during a synchronous upshift is illustrated. For example, the speed ratio of the transmission is represented by line 102, the desired or commanded speed of the turbine of the torque converter 24 is represented by line 104, an actual or measured speed of the turbine of the torque converter 24 is represented by line 106, the transmission input torque adjusted for inertia is represented by line 108, the desired or commanded torque of the oncoming clutch is represented by line 110, and the desired or commanded torque of the off-going clutch is represented by line 112. The transmission input torque adjusted for inertia 108 may be represented by the following relationship (1):

$$\tau_{adj} = \tau_{input} - (I_e + I_{in})\frac{dnt}{dt} + I_o\frac{dno}{dt} \qquad (1)$$

$\tau_{adj}$ is the transmission input torque adjusted for inertia
$\tau_{input}$ is the input torque of the transmission which is equal the torque of the engine 12 multiplied by the torque ratio of the torque converter 24.
$I_e$ is the inertia of the engine.
$I_{in}$ is the inertia of the input of the transmission 16.
$I_o$ is the inertia of the output of the transmission 16.
dnt/dt is the acceleration of the turbine of the torque converter 24.
dno/dt is the acceleration of the output of the transmission 16.
The graph may be representative of an upshift between any of the forward speed ratios that may be established by the transmission 16.

The upshift of the transmission 16 includes a preparation phase, the torque phase, and in inertia phase. During the preparation phase between times T1 and T4, the torque command of the oncoming clutch 110 is increased while the torque command of the off-going clutch 112 is decreased. The torque command of the oncoming clutch 110 is boosted between times T1 and T2 and then stroked until the kiss point is reached at time T4 where the actuator or piston of the oncoming clutch begins to engage friction and/or separator plates of the oncoming clutch. The torque command of the off-going clutch 112 is ramped down between times T1 and T3 to an off-going capacity reduction torque 113. The torque command of the off-going clutch 112 remains at the off-going capacity reduction torque 113 from time T3 to time T4.

After the completion of the preparation phase of the upshift, the torque phase begins. During the torque phase, between time T4 and time T7, torque is transferred from the off-going clutch to the oncoming clutch. The change in the torque ratio of the transmission 16 also occurs during the torque phase of the upshift. The torque command of the oncoming clutch 110 is ramped up at a first increasing rate during a first portion of the torque phase and at a second increasing rate during a second portion of the torque phase, the first increasing rate may be greater than the second increasing rate. The torque command of the off-going clutch 112 is ramped down at a decreasing first rate during a first portion of the torque phase and at a second decreasing rate during a second portion of a torque phase, the first decreasing rate may be less than the second decreasing rate.

After completion of the torque phase, the inertia phase begins. During the inertia phase, between time T7 and T9, the torque of the off-going clutch is ramped to zero at time T8. The change in the speed ratio of the transmission 102 also occurs during the inertia phase of the upshift. The torque command of the oncoming clutch 110 is brought into equilibrium during the inertia phase while the oncoming gear elements within the transmission 16 are brought up to desired speed. The inertia phase ends at time T9 when the change in the speed ratio of the transmission 102 is completed. Once the inertia phase is completed at time T9, the torque command of the oncoming clutch 110 may be increased and ramped up to a desired value.

The difference between the commanded speed of the turbine 104 and the actual speed of the turbine 106 that is shown occurring after time T5 and prior to time T9 is representative of flare that may occur during a shift. Flare (or shift flare) is slippage or an increase in RPMs at the input of the transmission (which may be determined by an increase in the RPMs of the engine, impeller, or turbine) during a shift between gears during acceleration. Depending on the shifting circumstances and conditions, zero flare or a minimal amount of flare (less than 30 RPMs) may be desirable during the upshift. The time that a flare occurs may also occur during any time during the upshift. Furthermore, a desired minimal amount of flare may be timed to occur during a specific time window during the upshift. Therefore it should be understood that the magnitude and position of the flare depicted in FIG. 3 is for representative purposes only.

Under circumstances where flare may be desired, the flare may be timed to occur at some point after the start of the torque phase (indicated by time T5) and may have a magnitude that is less upper threshold. Flares occurring before time T5 may be referred to as early flares while flares occurring after time T5 may be referred to as late flares. Early flares (before time T5) and large-late flare (occurring after time T5 and exceeding the upper threshold) may be undesirable. A timer, depicted by line 114, begins at the end of the boost of the oncoming clutch. The timer calculates time T5 in order to categorize any detected flares as either late or early. The timer 114 is used to determine when to adapt the off-going capacity reduction torque 113. Flares occurring before the timer 114 expires are undesirable and the off-going capacity reduction torque 113 is adapted (increased) during subsequent upshifts based on the magnitude of flare until the flare stops. Flares occurring after timer 114 expires are considered late. If large enough in magnitude the off-going torque transfer torque capacity 120 is increased. If the magnitude of late flare is at the desired level, then the timing of the start of flare may be further utilized to adapt the off-going torque transfer torque capacity 120.

The change in the speed ratio of the transmission 102 is expected to begin or initiate at time T7 when the upshift transitions from the torque phase to the inertia phase and the commanded speed of the turbine transitions from an increasing value to a decreasing value. In the example depicted in FIG. 3, the speed ratio of the transmission is shown to begin at time T8 which is slightly after time T7. Time T7 may refer to as a target initiation time for the change in the speed ratio of the transmission 102 while time T8 may be an example of a measured or actual initiation time of the change in the speed ratio of the transmission 102. The actual initiation time of the speed ratio change of the transmission 102 is shown as occurring late in this example, however it should be understood that the actual initiation time may be early, on time (i.e., occurring at time T7), or late.

The transmission input torque adjusted for inertia 108 may have a commanded or desired value 116 that occurs at or just before (occurring at time T6 in this example) the initiation of the speed ratio change of the transmission 102. This desired value 116 of the transmission input torque adjusted for inertia 108 at the initiation of the speed ratio change of the transmission 102 may be a set value that ensures sufficient power is transmitted through the transmission to facilitate transferring power to oncoming elements (gears, shafts, etc.) during the upshift.

And adaptation timer may be used to detect the time it takes from the start of the torque phase at time T4 to the initiation of the change in the speed ratio of the transmission 102. The result of adaptation timer 118 may be used to calculate a difference (or error) between the target and actual initiation times of the change in the speed ratio of the transmission 102. Alternatively, the adaptation timer may be used to detect the time it takes from the start of the torque phase at time T4 to a desired flare that occurs after the start of the torque transfer phase and is less than an upper threshold. The result of the adaptation timer 118 may be used to calculate the difference (or error) between target and actual times of the desired flare.

A late or early value of the desired flare should not be confused with the late or early flare that is shown to occur before or after time T5. According to the method described herein, a late or early flare shown to occur before or after time T5 is metric that may trigger specific events, while a late or early desired flare is a separate metric that may trigger specific events that are different than the events triggered by the early or later flare that occurs before or after time T5.

It should be noted that the difference (or error) between the target and actual initiation times of the change in the speed ratio of the transmission 102 and/or the difference (or error) between target and actual times of a desired flare may be due to an earlier than expected or a later than expected initiation time of the ratio change or the desired flare, respectively. The timer may be used to measure the start of the torque phase at time T4 to the start time of the desired flare, the median time of the desired flare, the time where the desired flare peaks, or the end time of the desired flare. The difference (or error) between the target and actual initiation times of the change in the speed ratio of the transmission 102 and/or the target and actual times of a desired flare may be used to adjust the off-going capacity reduction torque 113 of the off-going clutch and/or the off-going torque transfer torque capacity 120 of the off-going clutch. The off-going torque transfer torque capacity 120 of the off-going clutch may correspond to the torque command of the off-going clutch at time T7 which corresponds to the end of the torque phase. However, the off-going torque transfer torque capacity 120 of the off-going clutch may occur prior to end of the torque transfer phase. For example, the off-going torque transfer torque capacity 120 of the off-going clutch may occur at time T6 or at any another time during the second portion of the torque phase where the off-going clutch is ramped down at a second decreasing rate.

Other factors may also be used to adjust the off-going capacity reduction torque 113 of the off-going clutch between times T3 and T4 and/or the off-going torque transfer torque capacity 120 of the off-going clutch. For example, the off-going capacity reduction torque 113 and/or the off-going torque transfer torque capacity 120 may be adjusted based on an early flare (occurring before time T5), a large-late flare (occurring after time T5 and above a threshold), a speed ratio change in the transmission occurring during the boost phase of the oncoming clutch, and/or an aggressive torque ramping scenario caused by a late shift initiation.

Referring to FIG. 4 a table of an exemplary strategy for adapting off-going clutch torque capacity during synchronous upshifts is illustrated. The table includes various scenarios and methods for updating the off-going capacity reduction torque 113 and/or the off-going torque transfer torque capacity 120 of the off-going clutch. The various scenario and methods for updating either the off-going capacity reduction torque 113 or the off-going torque transfer torque capacity 120 may be stored as control logic, algorithms, and/or look-up tables within in the controller 30. Furthermore, the various scenarios and methods for updating either the off-going capacity reduction torque 113 or the off-going torque transfer torque capacity 120 may be implemented by the controller 30 in response to signals indicative of various conditions of the vehicle 10. The off-going capacity reduction torque 113 and/or the off-going torque transfer torque capacity 120 of the off-going clutch may be adjusted during subsequent upshifts based on the various conditions of current and/or prior upshifts. The control logic, algorithms, and/or look-up tables may be unique to a specific set of two gears that establish one of the forward speed ratios, the specific oncoming clutch, and the specific off-going clutch involved in a single upshift.

A first scenario in the table involves detecting the start of a speed ratio change in the transmission 16 during a boost period of the oncoming clutch in the absence of detecting an early flare in the off-going clutch during an upshift. Under the first scenario, there is no adjustment to the off-going capacity reduction torque 113 or the off-going torque transfer torque capacity 120 of the off-going clutch during subsequent upshifts.

A second scenario in the table involves detecting both the start of the speed ratio change in the transmission 16 during the boost period of the oncoming clutch and detecting an early flare in the off-going clutch during an upshift, while a third scenario in the table involves detecting an early flare in the off-going clutch in the absence of detecting the start of the speed ratio change in the transmission 16 during the boost period of the oncoming clutch during an upshift. Under either the second or the third scenario, the off-going capacity reduction torque 113 of the off-going clutch is increased during subsequent upshifts based on the size of the early flare in order reduce undesired early flare during subsequent upshifts. The off-going capacity reduction torque 113 during subsequent upshifts may increase as the magnitude of the early the early flare increases. The increase in the off-going capacity reduction torque 113 during subsequent upshifts according the second or third scenario may correspond to other variables stored in look-up tables that may affect any subsequent adjustment. For example, the adjustment to the off-going capacity reduction torque 113 during subsequent upshifts may only occur during subsequent upshifts that correspond with or are in the same vicinity of a look-up table as other variables such as the transmission input torque (which may be adjusted for inertia), clutch oil temperature, which gears were involved in the upshift, stroke positions of the oncoming or off-going clutch actuators, etc. There is no adjustment to the off-going torque transfer torque capacity 120 of the off-going clutch under either the second or third scenario.

A fourth scenario in the table involves detecting a large-late flare in the off-going clutch during or after the torque transfer phase during an upshift in the absence of detecting an early flare in the off-going clutch and in the absence of detecting the start of the speed ratio change in the transmission 16 occurring during the boost period of the oncoming clutch. Under the fourth scenario there is no adjustment to the off-going capacity reduction torque 113 of the off-going clutch during subsequent upshifts. The off-going torque transfer torque capacity 120 of the off-going clutch during the fourth scenario, however, is increased to reduce the magnitude of an undesired large-late flare. The amount of increase in off-going torque transfer torque capacity 120 during subsequent upshifts may increase as the magnitude of the large-late flare increases. The increase in the off-going torque transfer torque capacity 120 during subsequent upshifts under the fourth scenario may correspond to other variables stored in look-up tables that may affect any subsequent adjustment. For example, the adjustment to the off-going torque transfer torque capacity 120 during subsequent upshifts may only occur during subsequent upshifts that correspond with or are in the same vicinity of a look-up table as other variables such as the transmission input torque (which may be adjusted for inertia), clutch oil temperature, which gears were involved in the upshift, stroke positions of the oncoming or off-going clutch actuators, etc.

A fifth scenario in the table involves detecting "good or acceptable timing" from the start of the torque phase at time T4 to the initiation of the change in the speed ratio of the transmission 102 according to the adaptation timer 118 during an upshift in the absence of detecting a large-late flare in the off-going clutch, in the absence of detecting an early flare in the off-going clutch, and in the absence of detecting the start of the speed ratio change in the transmission 16 occurring during the boost period of the oncoming clutch. "Good or acceptable timing" under the fifth scenario occurs when the difference (or error) between the target initiation time and the actual initiation time of the change in the speed ratio of the transmission 102 is less than a threshold. Under the fifth scenario the off-going capacity reduction torque 113 of the off-going clutch is reduced. The off-going capacity reduction torque 113 may be gradually ratcheted down to a base minimum value over several cycles of upshifts or may be clipped to the minimum base value if the off-going capacity reduction torque 113 was increased during previous upshifts due to early flare according to the second or third scenarios described above. The off-going torque transfer torque capacity 120 of the off-going clutch is also reduced under the fifth scenario. The adjustment to the off-going capacity reduction torque 113 and/or the adjustment of the off-going torque transfer torque capacity 120 of the off-going clutch during subsequent upshifts according to the fifth scenario may correspond to other variables stored in look-up tables that may affect any subsequent adjustment. For example, an adjustment to the off-going capacity reduction torque 113 and/or an adjustment to the off-going torque transfer torque capacity 120 of the off-going clutch during subsequent upshifts may only occur during subsequent upshifts that correspond with or are in the same vicinity of a look-up table as other variables such as the transmission input torque (which may be adjusted for inertia), clutch oil temperature, which gears were involved in the upshift, stroke positions of the oncoming or off-going clutch actuators, etc.

A sixth scenario in the table involves detecting a late target or desired flare or a late initiation time to the change in the speed ratio of the transmission 102 measured from the start of the torque phase at time T4 according to the adaptation timer 118 during an upshift with an aggressive ramp (due to the shift starting late) in the absence of detecting a large-late flare (according to a late or early flare shown to occur before or after time T5, which is not synonymous with a late desired flare) in the off-going clutch, in the absence of detecting an early flare (according to a late or early flare shown to occur before or after time T5, which not synonymous with an early desired flare) in the off-going clutch, and in the absence of detecting the start of the speed ratio change in the transmission 16 occurring during the boost period of the oncoming clutch. Late desired flare and/or a late initiation of the change in the speed ratio the transmission 102 may refer to the difference (or error) between the target initiation time and the actual initiation time of the change in the speed ratio of the transmission 102 exceeding a threshold or the difference (or error) between target and actual times of a desired flare exceeding a threshold, where the actual initiation time of the change in the speed ratio and/or the actual time of a desired flare are greater than the target initiation time of the change in the speed ratio and/or target time of a desired flare, respectively. An aggressive ramp may refer to accelerating the torque transfer from the off-going clutch to the ongoing clutch due to a delayed or late start of an upshift. Under the sixth scenario the off-going capacity reduction torque 113 of the off-going clutch is reduced in the same manner as in the fifth scenario.

The off-going torque transfer torque capacity 120 of the off-going clutch under the sixth scenario may be reduced during subsequent upshifts based on an algorithm that correlates with the aggressive ramp or an algorithm that correlates with the late desired flare and/or the late initiation time to the change in the speed ratio of the transmission 102. The sixth scenario may require reducing the off-going torque transfer torque capacity 120 of the off-going clutch based on which of the two algorithms will produce the greatest the reduction. The algorithm that correlates with the aggressive ramp and/or the algorithm that correlates with the late desired flare or a late initiation time to the change in the speed ratio of the transmission 102 may each correspond to other variables stored in look-up tables that may affect any subsequent adjustment. For example, an adjustment to the off-going torque transfer torque capacity 120 of the off-going clutch during subsequent upshifts may only occur during subsequent upshifts that correspond with or are in the same vicinity of a look-up table as other variables such as the transmission input torque (which may be adjusted for inertia), clutch oil temperature, which gears were involved in the upshift, stroke positions of the oncoming or off-going clutch actuators, etc.

More particularly under the sixth scenario, when the off-going torque transfer torque capacity 120 of the off-going clutch is reduced during subsequent upshifts based the algorithm that correlates with the late desired flare and/or the late initiation time to the change in the speed ratio of the transmission 102, the off-going torque transfer torque capacity 120 of the off-going clutch may be reduced based on which of the two events (namely a late desired flare or a late initiation time to the change in the speed ratio of the transmission 102) occurs or which of the two events occurs first. If the late desired flare occurs alone or occurs first, the algorithm may include reducing the off-going torque transfer torque capacity 120 during subsequent upshifts by updating a first look-up table based on the error (difference between actual and desired) in the timing of the desired flare, where the look-up table correlates the off-going torque transfer torque capacity 120 to both the desired flare timing and the transmission input torque (which may be adjusted for inertia). If the late initiation time to the change in the speed ratio of the transmission 102 occurs alone or occurs first, the algorithm may include reducing the off-going torque transfer torque capacity 120 during subsequent upshifts by updating a second look-up table based on the error (difference between actual and desired) in the timing of the initiation time of the change in the speed ratio of the transmission 102, where the look-up table correlates the off-going torque transfer torque capacity 120 to both the desired timing of the initiation time of the change in the speed ratio of the transmission 102 and the transmission input torque (which may be adjusted for inertia).

A seventh scenario in the table in involves detecting an early desired flare that is larger than an acceptable threshold measured from the start of the torque phase at time T4 according to the adaptation timer 118 during an upshift in the absence of detecting a large-late flare in the off-going clutch (according to a late or early flare shown to occur before or after time T5, which is not synonymous with a late desired flare), in the absence of an detecting early flare in the off-going clutch (according to a late or early flare shown to occur before or after time T5, which not synonymous with an early desired flare), and in the absence of detecting the start of the speed ratio change in the transmission 16 occurring during the boost period of the oncoming clutch.

Under the seventh scenario the off-going capacity reduction torque 113 of the off-going clutch is reduced in the same manner as in the fifth scenario. Under the seventh scenario, the off-going torque transfer torque capacity 120 of the off-going clutch is increased during subsequent upshifts based on the timing and magnitude of the large-early desired flare. The off-going torque transfer torque capacity 120 of the off-going clutch may correspond to other variables stored in look-up tables that may affect any subsequent adjustment. For example, an adjustment to the off-going torque transfer torque capacity 120 of the off-going clutch during subsequent upshifts may only occur during subsequent upshifts that correspond with or are in the same vicinity of a look-up table as other variables such as the transmission input torque (which may be adjusted for inertia), clutch oil temperature, which gears were involved in the upshift, stroke positions of the oncoming or off-going clutch actuators, etc. More particularly, however, the algorithm used update the off-going torque transfer torque capacity 120 of the off-going clutch during subsequent upshifts may include updating a look-up table based on the error (difference between actual and desired) in the timing of the desired flare, where the look-up table correlates the off-going torque transfer torque capacity 120 to both the desired flare timing and the transmission input torque (which may be adjusted for inertia).

An eighth scenario in the table in involves detecting a late target or desired flare or a late initiation time to the change in the speed ratio of the transmission 102 measured from the start of the torque phase at time T4 according to the adaptation timer 118 during an upshift in the absence of detecting an aggressive ramp, in the absence of detecting a large-late flare in the off-going clutch (according to a late or early flare shown to occur before or after time T5, which is not synonymous with a late desired flare), in the absence of detecting an early flare in the off-going clutch (according to a late or early flare shown to occur before or after time T5, which not synonymous with an early desired flare), and in the absence of detecting the start of the speed ratio change in the transmission 16 occurring during the boost period of the oncoming clutch. Under the eighth scenario, the off-going capacity reduction torque 113 of the off-going clutch is reduced in the same manner as in the fifth scenario. Also, under the eighth scenario, the off-going torque transfer torque capacity 120 of the off-going clutch is reduced based on the algorithm that correlates with the late desired flare and/or the late initiation time to the change in the speed ratio of the transmission 102, described with respect to the sixth scenario above.

A ninth scenario in the table in involves detecting "good or acceptable flare" measured from the start of the torque phase at time T4 according to the adaptation timer 118 during an upshift in the absence of detecting a large-late flare in the off-going clutch (according to a late or early flare shown to occur before or after time T5, which is not synonymous with a late desired flare), in the absence of detecting an early flare in the off-going clutch (according to a late or early flare shown to occur before or after time T5, which not synonymous with an early desired flare), and in the absence of detecting the start of the speed ratio change in the transmission 16 occurring during the boost period of the oncoming clutch. "Good or acceptable flare" under the ninth scenario occurs when the difference (or error) between the target timing of the desired flare and the actual timing of the desired flare is less than a threshold. "Good or acceptable flare" may also require the flare value to be less than a threshold. Under the ninth scenario, the off-going capacity reduction torque 113 of the off-going clutch is reduced in the same manner as in the fifth scenario. Also, under the ninth scenario, there is no adjustment to the off-going torque transfer torque capacity 120 of the off-going clutch.

Each scenario in the table, first through ninth, for updating the off-going capacity reduction torque 113 and/or the off-going torque transfer torque capacity 120 of the off-going clutch is shown in an order of priority. The order of priority may include overriding any existing command of a lower priority scenario in favor of a higher priority scenario if conditions are such that multiple scenarios coexist. However, it should be understood that the priority of the scenarios may be adjusted and/or rearranged. Furthermore, some of the scenarios may be omitted entirety from the table.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
   a transmission having clutches and multiple speed ratios that are established during gear upshifts upon torque being transferred from off-going to oncoming clutches; and
   a controller programmed to, in response to a difference between actual and target initiation times of a speed ratio change exceeding a threshold and the target initiation time preceding the actual initiation time during an upshift, decrease the torque of the off-going clutch during a torque transfer phase of a subsequent upshift based on the difference.

2. The vehicle of claim 1, wherein the controller is programmed to, in response to the difference exceeding the threshold and the actual initiation preceding the target initiation time, increase the torque of the off-going clutch during the torque transfer phase of the subsequent upshift based on the difference.

3. The vehicle of claim 1, wherein the torque of the off-going clutch is adjusted at an end of the torque transfer phase of the subsequent upshift based on the difference.

4. The vehicle of claim 1, wherein the controller is programmed to, in response to detecting a flare at a transmission input before a start of a current shift torque transfer phase, override adjusting the torque of the off-going clutch during the torque transfer phase of the subsequent upshift based on the difference and maintain a current torque of the off-going clutch during the torque transfer phase of the subsequent upshift.

5. The vehicle of claim 4, wherein the controller is programmed to, in response to detecting the flare before the start of the current shift torque transfer phase, increase the torque of the off-going clutch prior to the torque transfer phase of the subsequent upshift.

6. The vehicle of claim 1, wherein the controller is programmed to, in response to detecting a flare at a transmission input after a start of a current shift torque transfer phase that exceeds a speed threshold, override adjusting the torque of the off-going clutch during the torque transfer phase of the subsequent upshift based on the difference and increase the torque of the off-going clutch during the torque transfer phase of the subsequent upshift.

7. The vehicle of claim 1, wherein the controller is programmed to, in response to a difference between actual and target times of a desired flare at a transmission input exceeding a threshold during the upshift, adjust the torque of the off-going clutch during the torque transfer phase of the subsequent upshift based on the difference between actual and target times of a desired flare if the actual time of the desired flare precedes the actual initiation time of the speed ratio change.

8. A vehicle comprising:
  a transmission having clutches and multiple speed ratios that are established during gear upshifts upon torque being transferred from off-going to oncoming clutches; and
  a controller programmed to, in response to a difference between actual and target times of a desired flare at a transmission input exceeding a threshold and the target time preceding the actual time during an upshift, decrease the torque of the off-going clutch during a torque transfer phase of a subsequent upshift based on the difference.

9. The vehicle of claim 8, wherein the controller is programmed to, in response to the difference exceeding the threshold and the actual time preceding the target time, increase the torque of the off-going clutch during the torque transfer phase of the subsequent upshift based on the difference.

10. The vehicle of claim 8, wherein the torque of the off-going clutch is adjusted at an end of the torque transfer phase of the subsequent upshift based on the difference.

11. The vehicle of claim 8, wherein the controller is programmed to, in response to detecting the flare before a start of a current shift torque transfer phase, override adjusting the torque of the off-going clutch during the torque transfer phase of the subsequent upshift based on the difference and maintain a current torque of the off-going clutch during the torque transfer phase of the subsequent upshift.

12. The vehicle of claim 11, wherein the controller is programmed to, in response to detecting the flare before the start of the current shift torque transfer phase, increase the torque of the off-going clutch prior to the torque transfer phase of the subsequent upshift.

13. The vehicle of claim 8, wherein the controller is programmed to, in response to detecting the flare after a start of a current shift torque transfer phase and the flare exceeding a speed threshold, override adjusting the torque of the off-going clutch during the torque transfer phase of the subsequent upshift based on the difference and increase the torque of the off-going clutch during the torque transfer phase of the subsequent upshift.

14. The vehicle of claim 8, wherein the controller is programmed to, in response to a difference between actual and target initiation times of a speed ratio change exceeding a threshold during the upshift, adjust the torque of the off-going clutch during the torque transfer phase of the subsequent upshift based on the difference between actual and target initiation times of the speed ratio change if the actual initiation time of the speed ratio change precedes the actual time of the desired flare.

15. A method comprising:
  adjusting a torque of an off-going clutch in a vehicle transmission during a torque transfer phase of a subsequent transmission upshift based on and in response to a difference between actual and target times of a desired flare at a transmission input exceeding a threshold during a current upshift; and
  adjusting the torque of the off-going clutch in the vehicle transmission during the torque transfer phase of the subsequent transmission upshift based on and in response to a difference between actual and target initiation times of a speed ratio change of the transmission exceeding a threshold during a prior upshift if the actual initiation time of the speed ratio change precedes the actual time of the desired flare.

16. The method of claim 15 further comprising overriding adjusting the torque of the off-going clutch during the torque transfer phase of the subsequent upshift based on the difference and maintaining a current torque of the off-going clutch during the torque transfer phase of the subsequent upshift in response to detecting flare before a start of a current shift torque transfer phase.

17. The method of claim 15, overriding adjusting the torque of the off-going clutch during the torque transfer phase of the subsequent upshift based on the difference and increasing the torque of the off-going clutch during the torque transfer phase of the subsequent upshift in response to detecting the flare after a start of a current shift torque transfer phase and the flare exceeding a speed threshold.

* * * * *